(12) United States Patent
Hall et al.

(10) Patent No.: US 9,539,781 B2
(45) Date of Patent: Jan. 10, 2017

(54) BALANCED CELL FOR HIGH-PRESSURE HIGH-TEMPERATURE PRESS

(71) Applicant: Novatek IP, LLC, Provo, UT (US)

(72) Inventors: David R. Hall, Provo, UT (US); Scott S. Dahlgren, Alpine, UT (US); Michael Hall, Springville, UT (US); Ronald B. Crockett, Spring City, UT (US); Timothy C. Duke, Provo, UT (US)

( * ) Notice: Subject to any disclaimer, the term of this patent is extended or adjusted under 35 U.S.C. 154(b) by 0 days.

(21) Appl. No.: 14/837,761

(22) Filed: Aug. 27, 2015

(65) Prior Publication Data

US 2016/0059505 A1 Mar. 3, 2016

Related U.S. Application Data

(60) Provisional application No. 62/044,094, filed on Aug. 29, 2014, provisional application No. 62/045,752, filed on Sep. 4, 2014, provisional application No. 62/052,191, filed on Sep. 18, 2014.

(51) Int. Cl.
*B30B 15/34* (2006.01)
*B30B 11/00* (2006.01)
*B01J 3/06* (2006.01)

(52) U.S. Cl.
CPC ............. *B30B 11/004* (2013.01); *B01J 3/067* (2013.01); *B30B 11/007* (2013.01); *B30B 15/34* (2013.01)

(58) Field of Classification Search
CPC ....... B30B 11/004; B30B 11/007; B30B 15/34
USPC .................................. 425/77, 405.2
See application file for complete search history.

(56) References Cited

U.S. PATENT DOCUMENTS 6,336,802 B1 1/2002 Hall
7,306,441 B2 * 12/2007 Sung ..................... B30B 11/004
425/77

OTHER PUBLICATIONS

Wang & He, A hybrid pressure cell of pyrophyllite and magnesium oxide to extend the pressure range for large volume cubic presses, High Pressure Research, Feb. 21, 2012.

* cited by examiner

*Primary Examiner* — Joseph S. Del Sole
*Assistant Examiner* — Thukhanh T Nguyen
(74) *Attorney, Agent, or Firm* — Philip W. Townsend, III

(57) ABSTRACT

High-pressure high-temperature presses are commonly employed to create superhard materials used in such fields as road milling, mining and trenching, to breakup tough materials such as asphalt, concrete and rock. Many such presses comprise a plurality of piston assemblies that may act in concert to pressurize a cell. Such a cell may comprise a body with at least three canisters disposed therein, each comprising an axis passing through a center of the body. Such a configuration may allow for maximum planes of symmetry within the cell.

14 Claims, 10 Drawing Sheets

BALANCED CELL FOR HIGH-PRESSURE HIGH-TEMPERATURE PRESS

CROSS REFERENCE TO RELATED APPLICATIONS

This patent claims priority to U.S. Provisional Pat. App. No. 62/044,094 entitled "Symmetrical Cell Design" and filed Aug. 29, 2014; U.S. Provisional Pat. App. No. 62/045,752 entitled "Individual Resistance Heating for a High Pressure Cell" and filed Sep. 4, 2014; and U.S. Provisional Pat. App. No. 62/052,191 entitled "Central Conductor Comprising Indentations for HPHT Cell" and filed Sep. 18, 2014; which are incorporated herein by reference for all that they contain.

BACKGROUND OF THE INVENTION

In such fields as road milling, mining and trenching, superhard materials, such as polycrystalline diamond, may be used to breakup tough materials such as asphalt, concrete and rock. High-pressure high-temperature ("HPHT") presses are commonly employed to create such superhard materials. While HPHT presses have been made in a variety of styles over the years, many HPHT presses comprise a plurality of piston assemblies that may act in concert to pressurize a cell. One example of such an HPHT press is disclosed in U.S. Pat. No. 6,336,802 to Hall which describes a press with a frame comprising intersecting boreholes with means for attachment of a plurality of cartridges. Each cartridge may comprise a piston therein with an anvil protruding there from into a cavity resulting from an intersection of the boreholes. Advancement of the anvils toward a center of the cavity may enclose and define a high-pressure chamber within the press.

A cell may be disposed within such a high-pressure chamber comprising the raw components required to form superhard materials. One example of raw components capable of forming a superhard material comprises diamond grains disposed within a metal canister adjacent a carbide substrate. The carbide substrate may comprise a catalyst that may sweep into the diamond grains under certain HPHT conditions to aid in sintering the diamond grains together. One or more such canisters may be surrounded by a pressure-transferring medium, such as pyrophyllite, that may form a pressure sealing gasket within gaps between adjacent anvils as well as balance pressure around the canisters. Electrically resistive materials may also be disposed within such cells that may heat the cells to desired temperatures when electricity is passed through the cell from one anvil to another.

One known cell configuration, shown in FIG. 1, comprises a cube 100 generally made of pyrophyllite. The cube 100 comprises a cylindrical bore 105 there though. A plurality of metal canisters 110 may be stacked face-to-face, secured within a salt form 108 disposed within the cylindrical bore 105. A metal tube 109 may surround the salt form 108 and provide an electrical path from one end to another. At least one electrically resistive heater 107 may sit on either end of the salt form 108 and provide heat when electricity is passed there through.

While the cell configuration shown in FIG. 1 may be symmetrical end-to-end, it lacks symmetry in the eight other possible planes of symmetry 202 shown in FIG. 2. Such asymmetry may lead to uneven pressure and/or heat distribution. Specifically, each of the plurality of canisters may experience different pressure and temperature gradients throughout its interior based on its unique position relative to the anvils and resistive heaters. Thus, a need exists for more balanced cell designs than previously existing.

BRIEF SUMMARY OF THE INVENTION

A cell for an HPHT press may comprise a body with at least three canisters disposed therein, each comprising an axis passing through a center of the body. Such a configuration may allow for maximum planes of symmetry within the cell. Possible body shapes for such a cell include cubes, tetrahedrons, dodecahedrons and the like. Each of a plurality of sides of the cell may be generally planar and be disposed at substantially similar angles from adjacent sides.

The body may be formed from various pressure-transferring materials like natural or synthetic pyrophyllite. The body may also be formed in a variety of ways such as mating two forms together on either side like a clam shell, fitting a plurality of generally pyramidal shaped forms together, one for each side, or fitting a plurality of generally cubic shaped forms together, one for each corner. Either way, portions of the body may be held together by pins, dovetails or other means. The generally pyramidal or cubic shaped forms may have truncated apexes or corners to make room for a separate center form within the body.

Some advantages of using the pyramidal shaped forms stem from how such forms may be manufactured. Specifically, a base of a pyramidal shaped form may be added after a remainder of the form is complete. Thus, the base may comprise different materials comprising different properties than the remainder. For instance, the base material may be less fluidic under HPHT conditions than the remainder material allowing for a solid gasket to be formed between adjacent anvils with a more fluidic interior. Also, various bases may comprise differing geometries such as edges that overlap an edge of an adjacent form.

As described earlier, a center form may be disposed within the body. Such a center form may serve a variety of purposes. For instance, the center form may be electrically resistive to form a heater for the cell. By placing such a heater in the center of the cell, the heat may be distributed more evenly throughout the cell. The center may also aid in holding the cell together. For instance, when the body is assembled from mating clam-shell shaped forms, such mating forms may be press fit onto a center form. Also, the center form may comprise a plurality of seats, one for receiving each canister of the cell.

DETAILED DESCRIPTION OF THE DRAWINGS

Figure 1:
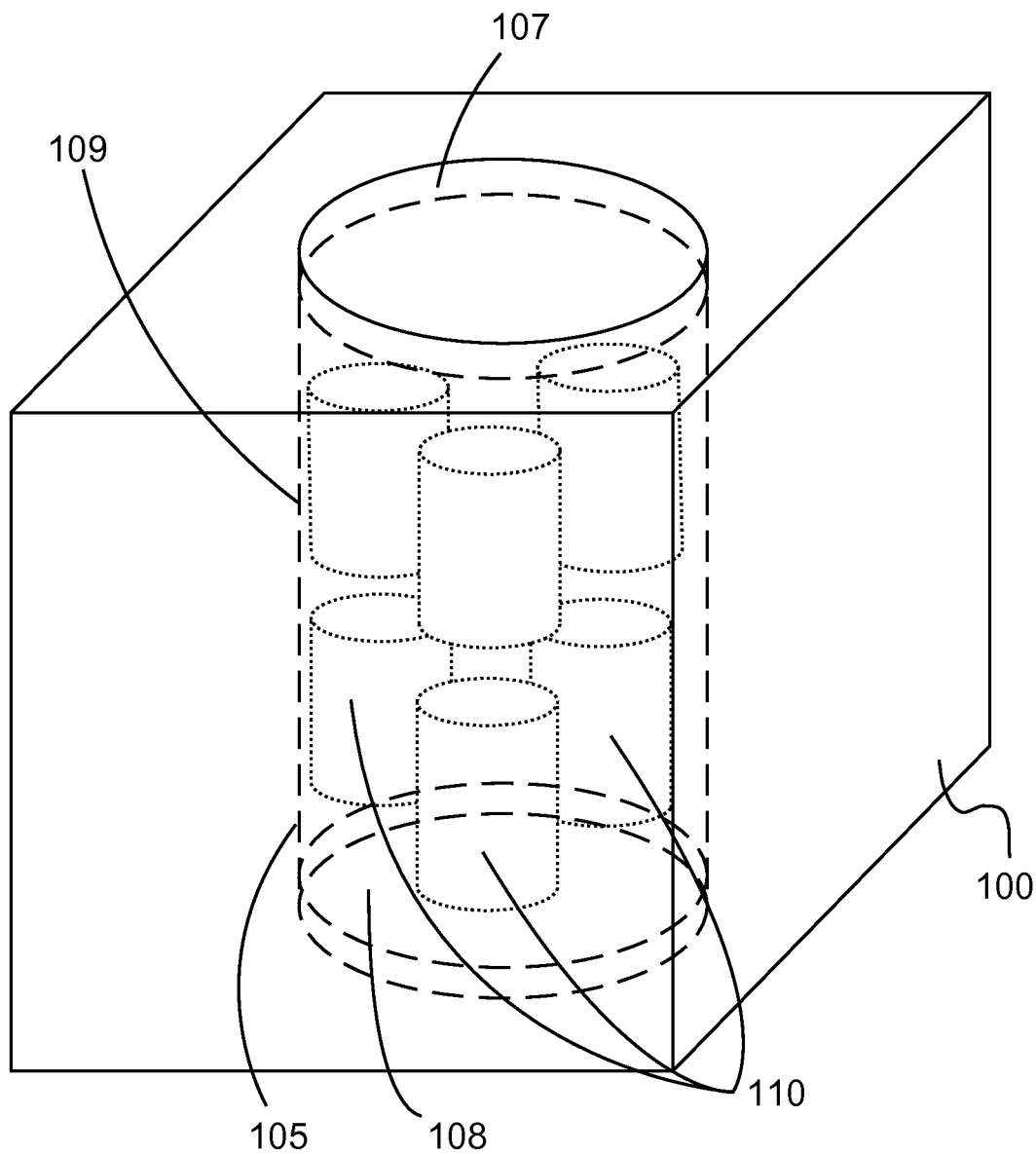
FIG. 1 is a perspective view of an embodiment of an HPHT cell configuration known in the prior art.
Figure 2:
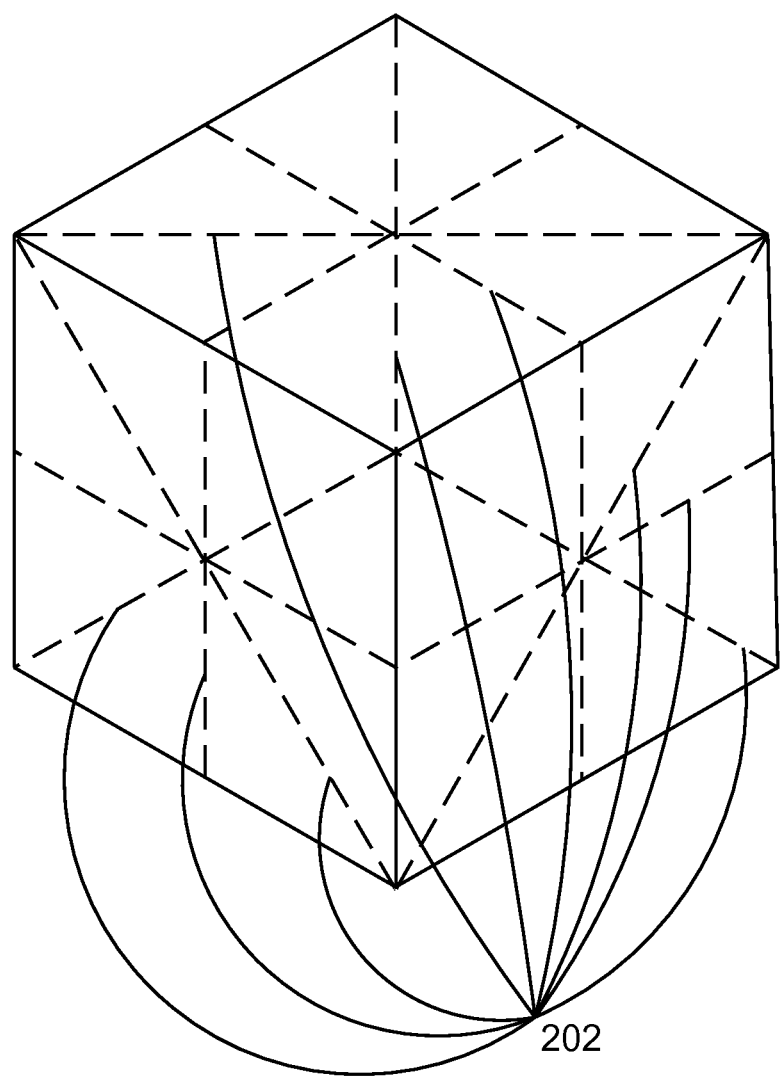
FIG. 2 is a perspective view of an embodiment of a cube showing nine possible planes of symmetry.
Figure 3:
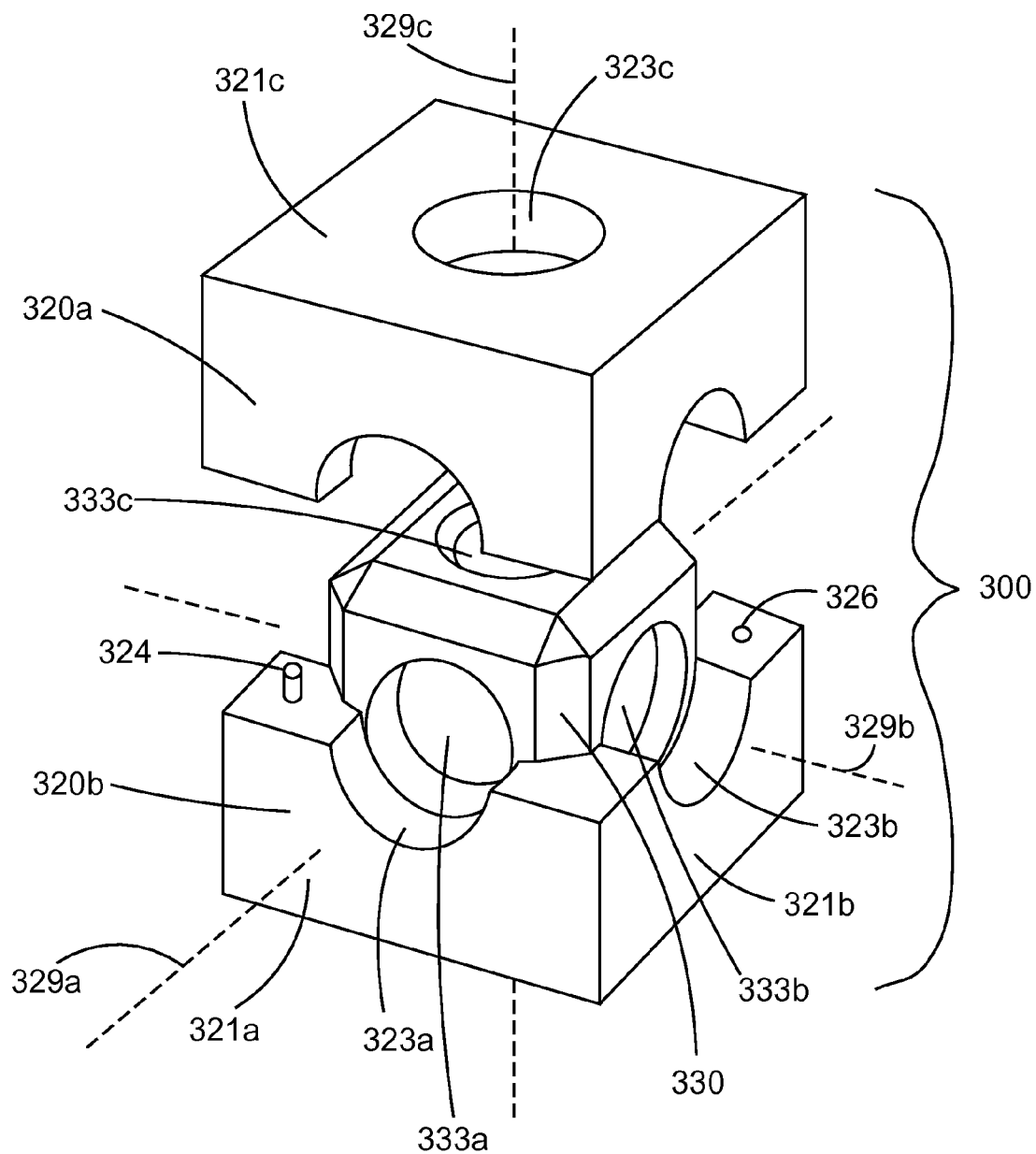
FIG. 3 is a partially-exploded perspective view of an embodiment of parts of an HPHT cell configuration comprising a generally cubic shaped body formed from two mating forms.

FIG. 3 shows an embodiment of parts of a cell for an HPHT press comprising a generally cubic shaped body 300 formed from two mating forms 320a, b. The two mating forms 320a, b may be made of natural or synthetic pyrophyllite or other pressure-transferring materials and fit like a clam shell over a center form 330 disposed within the body 300. The center form 330 may be made of salt or other pressure-transferring materials. To hold the body together, the two mating forms 320a, b may be press fit onto the center form 330 or comprise pins 324 that may fit into mating slots 326.

The generally cubic shaped body 300 comprises six sides 321a, b, c, (only three of which are viewable) each comprising a bore 323a, b, c, therein. Each of the bores 323a, b, c may comprise a respective center axis 329a, b, c passing through a center of the body and be sized to receive an individual canister (not shown). Similarly, the center form 330 may comprise six seats 333a, b, c, each aligned with one of the bores 323a, b, c and sized to receive a canister.

Figure 4:
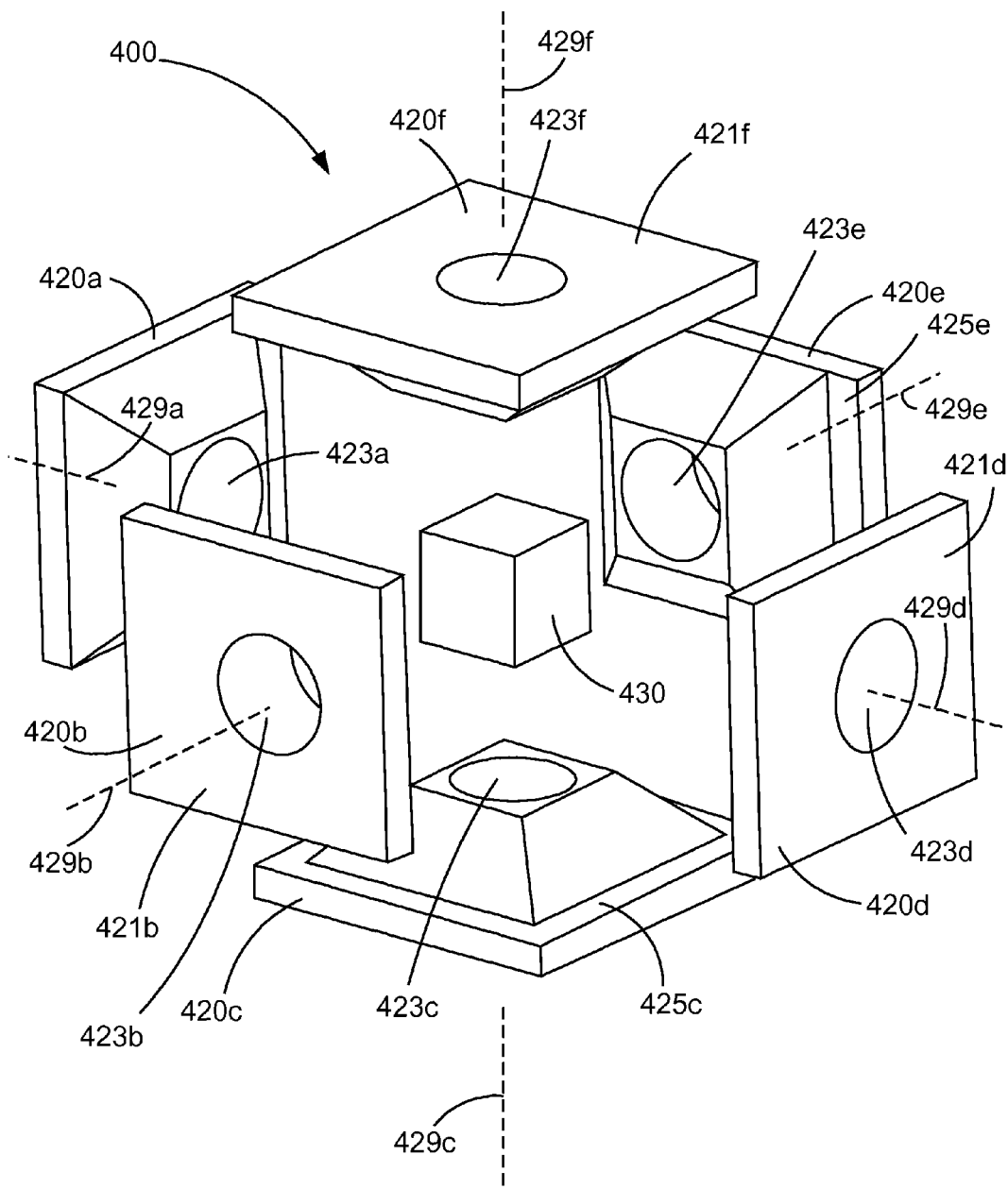
FIG. 4 is an exploded perspective view of an embodiment of parts of an HPHT cell configuration comprising a generally cubic shaped body formed from six generally pyramidal shaped forms.

FIG. 4 shows another embodiment of parts of a cell for an HPHT press comprising a generally cubic shaped body 400 formed from six generally pyramidal shaped forms 420a, b, c, d, e, f. The body 400 comprises six sides 421b, d, f, (only three of which are viewable) each comprising a bore 423a, b, c, d, e, f therein. Each of the bores 423a, b, c, d, e, f may comprise a respective center axis 429 a, b, c, d, e, f passing through a center of the body and be sized to receive an individual canister (not shown). The generally pyramidal shaped forms 420a, b, c, d, e, f may each comprise a truncated apex such that they may fit around a center form 430 disposed within the body 400. Some of the generally pyramidal shaped forms (such as 420c and e) may comprise edges 425c, e that may overlap an edge of an adjacent form when assembled.

Figure 5:
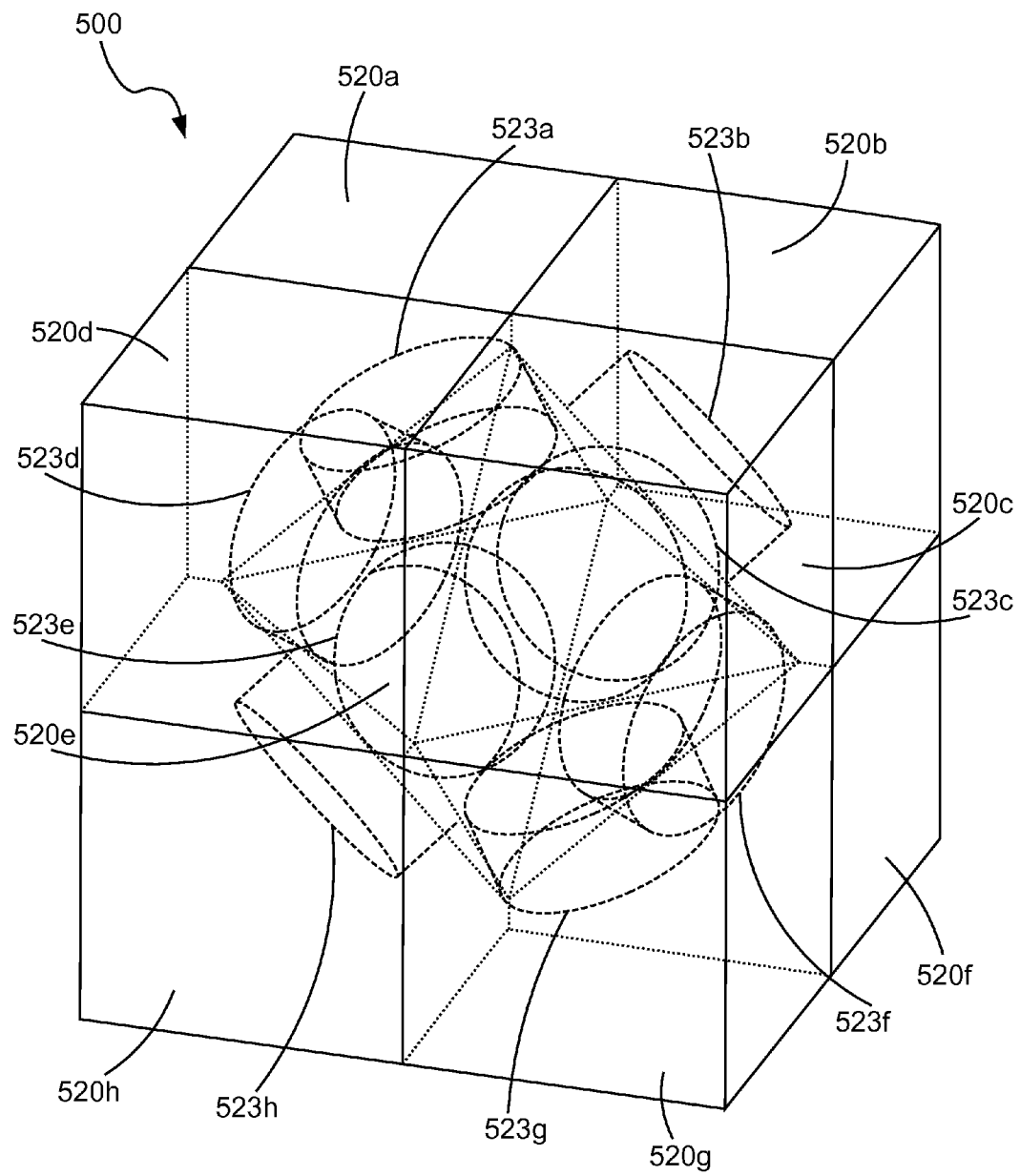
FIG. 5 is a perspective view of an embodiment of parts of an HPHT cell configuration comprising a generally cubic shaped body formed from eight generally cubic shaped forms.

FIG. 5 shows yet another embodiment of parts of a cell for an HPHT press comprising a generally cubic shaped body 500 formed from eight generally cubic shaped forms 520a, b, c, d, e, f, g and h each with a truncated corner comprising a surface perpendicular to an axis passing through a center of the body 500. A bore 523a, b, c, d, e, f, g and h is disposed within each of the respective cubic shaped forms 520a, b, c, d, e, f, g and h. Each of the bores 523a, b, c, d, e, f, g and h may be sized to receive an individual canister (not shown) comprising an axis passing through a center of the body 500 and a respective corner of the body 500.

Figure 6:
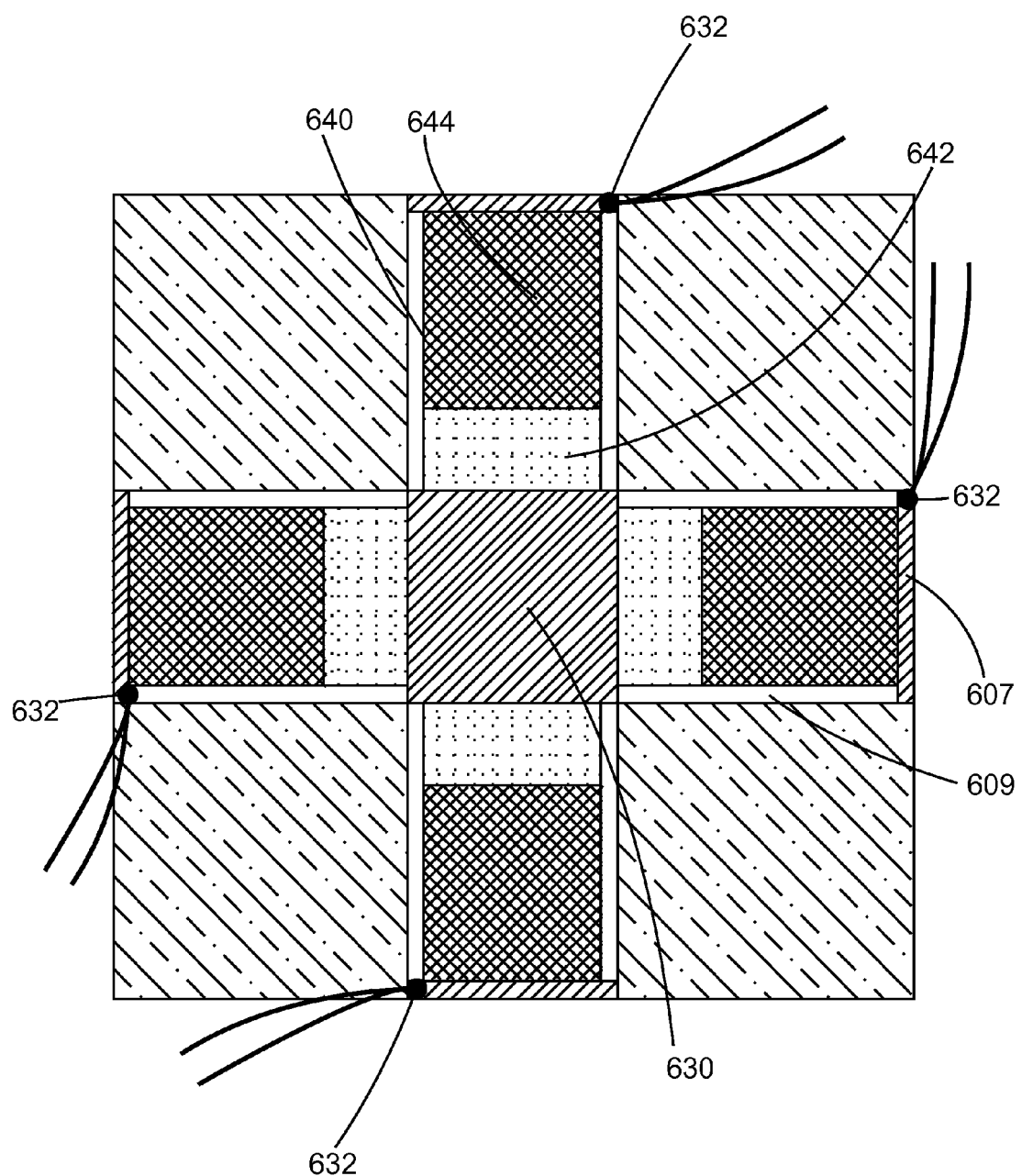
FIG. 6 is a cross-sectional view of an embodiment of an HPHT cell configuration comprising canisters disposed within bores on each side thereof.

Regardless of the configuration chosen, use of such a balanced cell in an HPHT press has many advantages. For example, FIG. 6 shows an embodiment of a cell comprising canisters 640 disposed within bores on each side thereof. Each of the canisters 640 may be formed of a metal, such as niobium, and have superhard grains 642, such as diamond grains, disposed adjacent a substrate 644, such as a tungsten carbide substrate, therein. An individual metal tube 609 may surround each of the canisters 640 and provide an electrical path from one end to another. Further, each of the canisters 640 may have at least one electrically resistive heater 607 sitting on either end thereof that may provide heat when electricity is passed there through. In the embodiment shown, a center form 630 disposed within the cell may also be electrically resistive and act as a uniform heater for the cell.

In such a configuration, as anvils of an HPHT press converge and apply pressure to each side of the cell, each of the canisters may receive substantially equal amounts of pressure and from the same relative directions. It is believed that such substantially equal amounts of pressure may result in more uniform end products. Further, as electricity is passed from one anvil to another, it may travel through a first electrically resistive heater, a first metal tube, the center form, and then out a second metal tube and a second electrically resistive heater. Through this electrical path, each of the canisters may receive substantially equal amounts of heat and from the same relative directions. It is believed that such substantially equal amounts of heat may further result in more uniform end products. To more accurately ensure substantially equal amounts of heat, at least one temperature sensor 632, such as a thermocouple or thermistor, may be disposed within the body to measure the temperature. In various embodiments, there may be at least one temperature sensor for each of the canisters 640 or for each of the electrically resistive heaters 607.

Figure 7A:
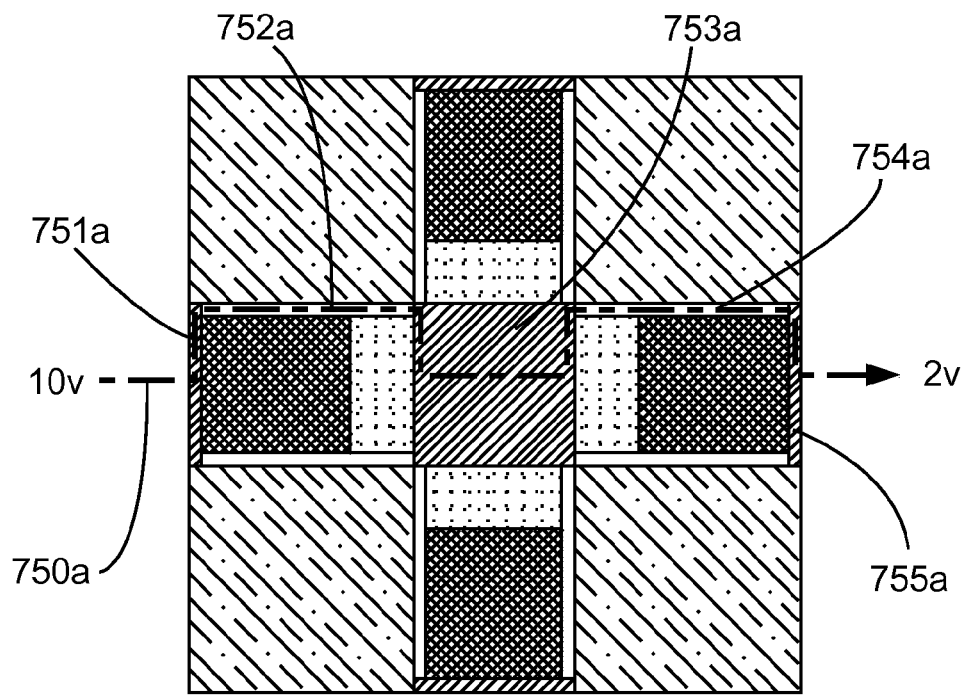
FIGS. 7a and 7b are cross-sectional representations of embodiments of electricity passing through HPHT cell configurations.
Figure 7B:
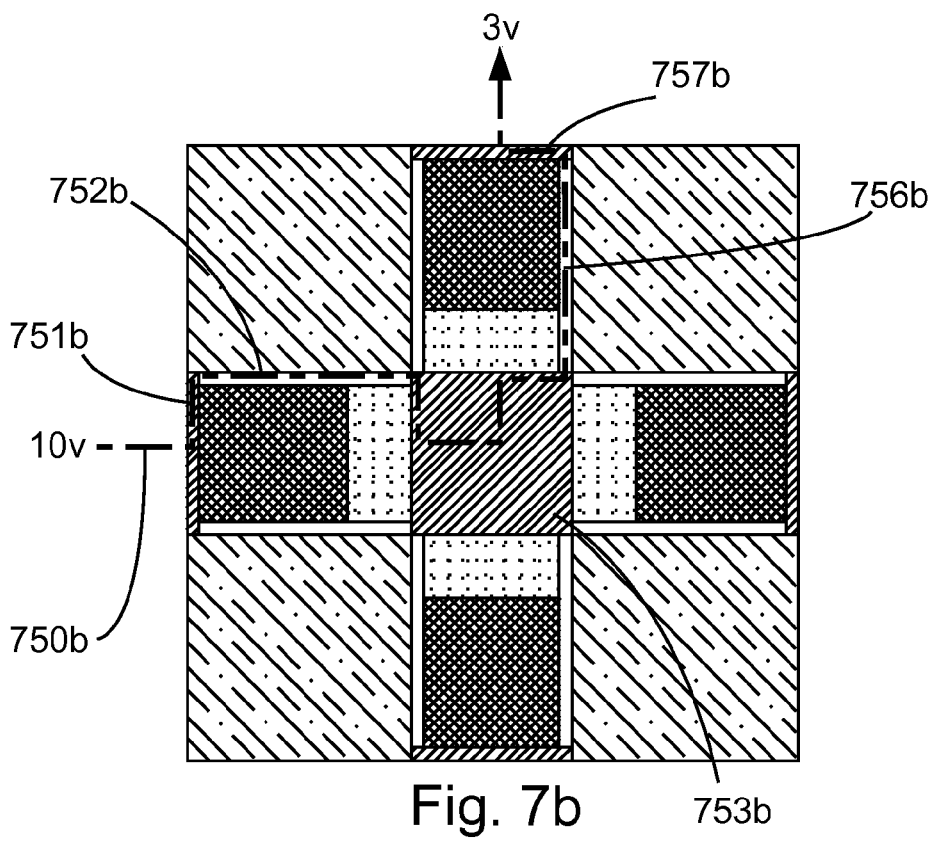

FIGS. 7a and 7b show embodiments of electricity 750a, b passing through cells with different natural electrical resistances within electrically resistive heaters sitting on either end of canisters disposed therein. These natural differences in electrical resistance may cause differences in voltage drops across such resistive heaters and, thereby, in amounts of heat dissipated. By alternating which anvils are electrically charged it may be possible to determine which pairs of resistive heaters are naturally dissipating more heat into their adjacent canisters. With this knowledge, it may be possible to increase or decrease the amount of heat being dissipated by each resistive heater by regulating the voltages of each anvil to equalize or otherwise more accurately control the temperature experienced by each canister.

For instance, FIG. 7a shows electricity 750a passing from a first anvil (not shown) having a voltage of 10 v, through a first electrically resistive heater 751a, a first metal tube 752a, a center form 753a, a second metal tube 754a, and a second electrically resistive heater 755a, to a second anvil (not shown) having a voltage of 2 v. This means that, due to the resistance in the electrical circuit, 8 volts have dissipated into the system in the form of heat. FIG. 7b shows electricity 750b passing from a first anvil (not shown) having a voltage of 10 v, through a first electrically resistive heater 751b, a first metal tube 752b, a center form 753b, a third metal tube 756b, and a third electrically resistive heater 757a, to a third anvil (not shown) having a voltage of 3 v. Thus, when electricity is passed through a different pair of resistive heaters, 7 volts are dissipated into the system in the form of heat. With this knowledge, it may be desirable to increase or decrease the voltage at the second or third anvils to equalize or otherwise more accurately control the heat received by each canister. As discussed previously, it is believed that substantially equal amounts of heat supplied to each canister may result in more uniform end products.

Figure 8A:
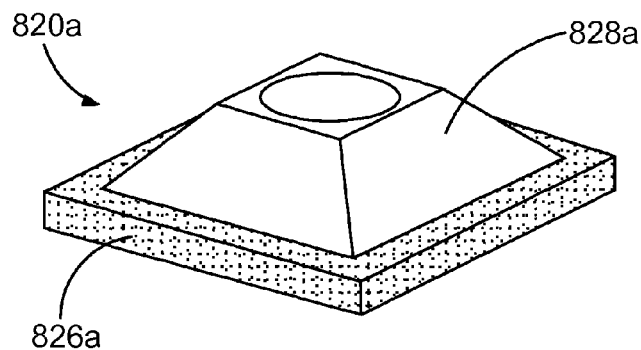
FIG. 8a is a perspective view of an embodiment of a generally pyramidal shaped form comprising a base comprising a different material than a remainder thereof.

One of the advantages of forming a balanced cell partially from generally pyramidal shaped forms as described above is the ease of creating a body comprising multiple materials comprising differing properties. For instance, FIG. 8a shows an embodiment of a generally pyramidal shaped form 820a comprising a base 826a comprising a different material than a remainder 828a thereof. This type of configuration may be desirable when a portion of a cell forming the edges thereof is expected to squeeze out between adjacent anvils when pressurized in an HPHT press. Such squeezing may be desirable to form a gasket between adjacent anvils allowing for sufficiently high pressures to be maintained. Due to the importance of such a gasket, the properties of a material forming such a gasket may be crucial. A remainder of a cell, that part not forming the gasket, may require significantly different material properties. Specifically, the remainder may need to flow more easily to balance forces within the cell. Thus, it may be desirable for the gasket material, or base 826a of the embodiment shown in FIG. 8a, to be less fluidic under HPHT conditions than the remainder material, or remainder 828a.

Figure 8B:
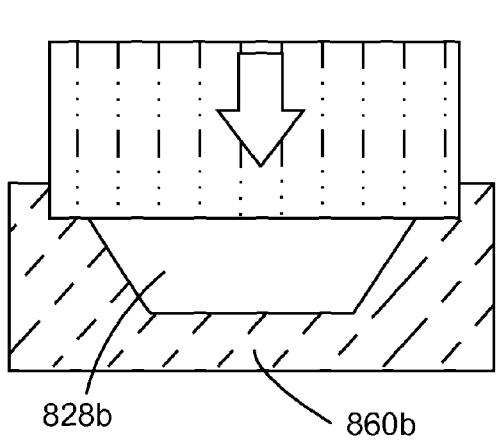
FIGS. 8b and 8c are schematic representations of an embodiment of a synthetic pyrophyllite pressing operation.
Figure 8C:
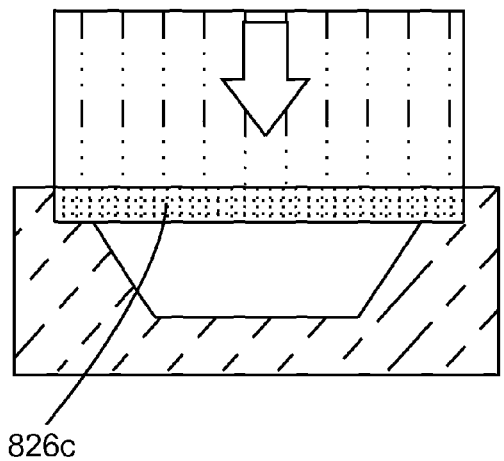

While forming a cell comprising different material properties on the inside from the outside may be difficult when working with a solid cube, pressing synthetic pyrophyllite may be a straightforward operation for creating a pyramidal shaped form comprising multiple materials as shown in the embodiment of FIG. 8a. For instance, FIGS. 8b and 8c show embodiments of a synthetic pyrophyllite pressing operation wherein a remainder material 828b is first pressed into a mold 860b followed by a base material 826c comprising different material properties into the same mold 860b. A cubic cell comprising different material properties on the inside from the outside may then be created by fitting together a plurality of pyramidal shaped forms as discussed previously.

Figure 9:
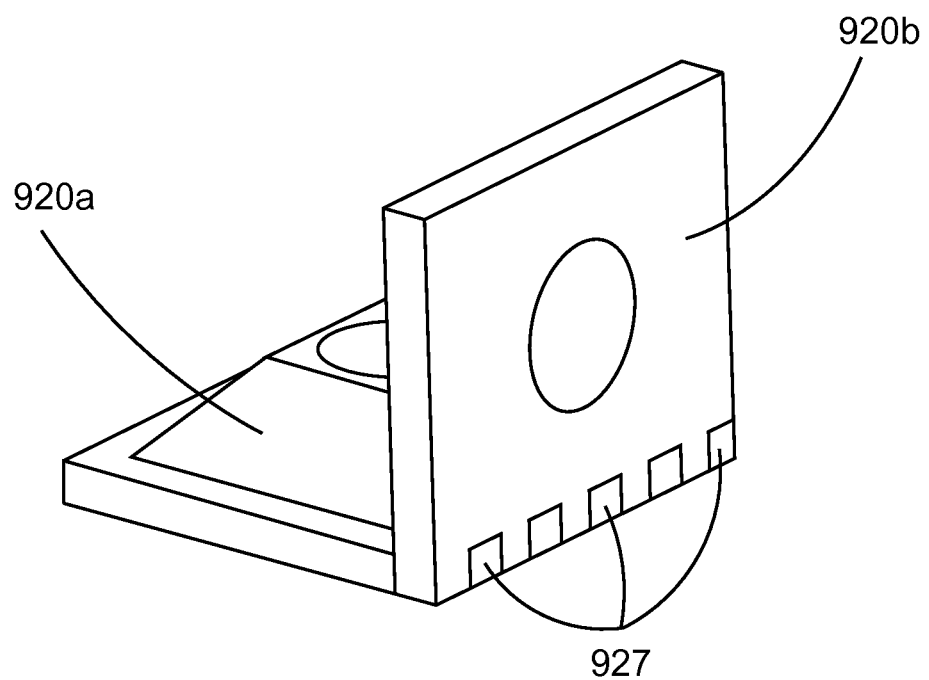
FIG. 9 is a perspective view of an embodiment of dovetails holding edges of generally pyramidal shaped forms together.

Another advantage of forming a balanced cell partially from generally pyramidal shaped forms 920a, b is the ability to hold at least portions of the cell together by joining edges of adjacent pyramidal shaped forms 920a, b with dovetails 927 as shown in an embodiment shown in FIG. 9.

Figure 10A:
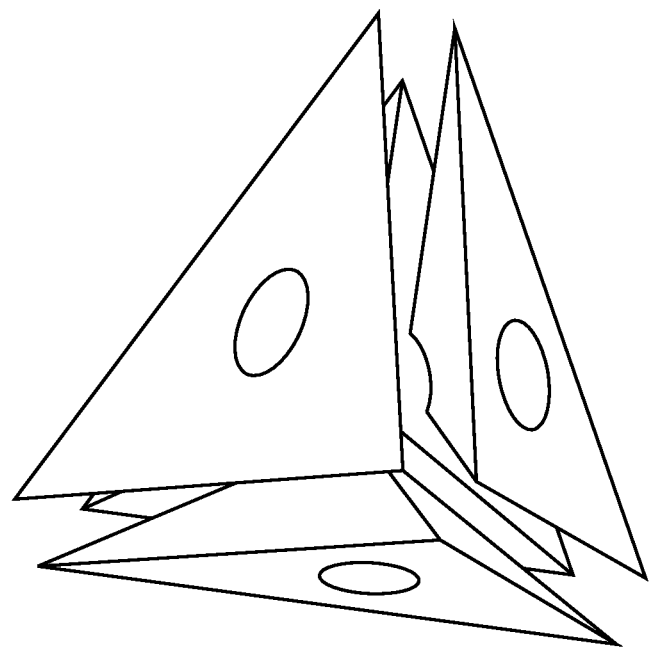
FIGS. 10a and 10b are perspective views of embodiments of HPHT cell configurations shaped as a tetrahedron and a dodecahedron respectively.
Figure 10B:
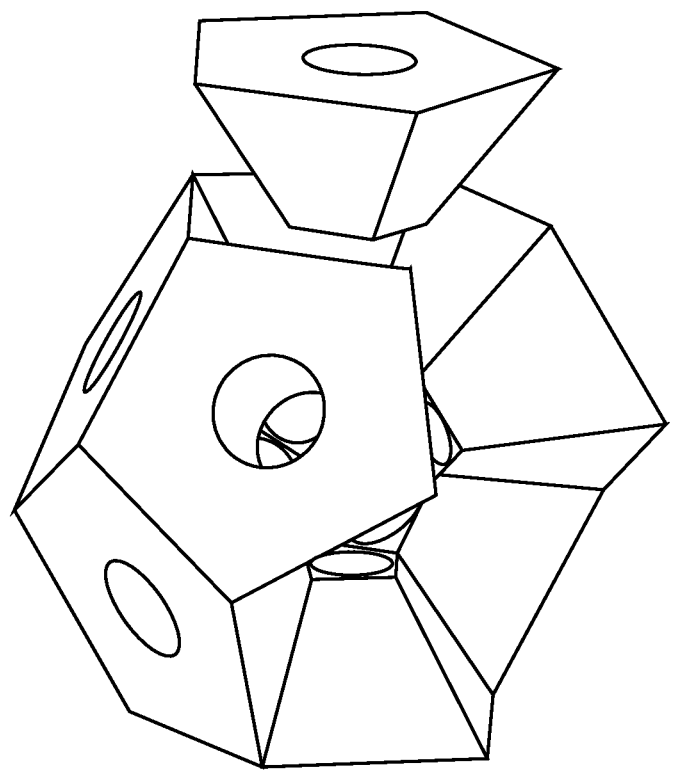

While we have generally discussed substantially cubic shaped cells up to this point where each of a plurality of sides of the cell are generally planar and disposed at substantially similar angles from adjacent sides, those of skill in the art will recognize that other shapes, such as a tetrahedron and a dodecahedron could be used with the present invention as well. Embodiments of each are shown in FIGS. 10a and 10b respectively.

Whereas the present invention has been described in particular relation to the drawings attached hereto, it should be understood that other and further modifications apart from those shown or suggested herein, may be made within the scope and spirit of the present invention.

The invention claimed is:

1. A cell for a high-pressure high-temperature press, comprising:
   a body with at least three canisters disposed therein; wherein
   each of the canisters comprises an axis passing through a center of the body; and
   no more than two canisters are coaxial.

2. The cell of claim 1, wherein the body is formed of two mating forms, each form comprising a bore passing completely therethrough sized to receive one of the canisters.

3. The cell of claim 1, wherein the body is formed of a plurality of generally pyramidal shaped forms, each form comprising a bore passing completely therethrough sized to receive one of the canisters.

4. The cell of claim 3, wherein at least one of the generally pyramidal shaped forms has an edge that overlaps an edge of an adjacent form.

5. The cell of claim 3, wherein each of the pyramidal shaped forms comprises a truncated apex and the bore passing completely through each form intersects the truncated apex.

6. The cell of claim 3, wherein a base of at least one of the generally pyramidal shaped forms comprises different material properties than a remainder of the form.

7. The cell of claim 6, wherein a material of the base is less fluidic under high pressure and high temperature conditions than a material of the remainder.

8. The cell of claim 1, wherein the body is formed of a plurality of generally cubic shaped forms, each form comprising a bore passing completely therethrough sized to receive one of the canisters.

9. The cell of claim 8, wherein each of generally cubic shaped forms comprises a truncated corner and the bore passing completely through each form intersects the truncated corner.

10. The cell of claim 9, wherein each of the truncated corners comprises a surface perpendicular to an axis passing through the center of the body.

11. The cell of claim 1, wherein the axis of each of the canisters passes through an exterior corner of the body.

12. The cell of claim 1, further comprising a separate center form within the body comprising a plurality of seats, one for receiving each canister.

13. The cell of claim 12, wherein the body is formed of two mating forms press fit onto the center form.

14. The cell of claim 12, wherein the separate center form is electrically resistive.

* * * * *